US008529221B2

(12) United States Patent
Futa, Jr. et al.

(10) Patent No.: US 8,529,221 B2
(45) Date of Patent: Sep. 10, 2013

(54) METHOD AND SYSTEM FOR FUEL CONTROL IN A GAS TURBINE ENGINE

(75) Inventors: Paul W. Futa, Jr., North Liberty, IN (US); Brent J. Gassman, South Bend, IN (US); Harold I. Miller, Elkhart, IN (US); Timothy F. Wiegand, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 1359 days.

(21) Appl. No.: 10/863,298

(22) Filed: Jun. 8, 2004

(65) Prior Publication Data

US 2005/0072160 A1 Apr. 7, 2005

Related U.S. Application Data

(60) Provisional application No. 60/507,946, filed on Oct. 3, 2003.

(51) Int. Cl.
*F02C 9/00* (2006.01)
*F02G 3/00* (2006.01)
*F04B 49/00* (2006.01)

(52) U.S. Cl.
USPC .................. 417/310; 60/39.281; 417/220

(58) Field of Classification Search
USPC .............. 60/773, 39.281, 734; 417/213, 220, 417/302, 304, 307, 308, 310
See application file for complete search history.

(56) References Cited

U.S. PATENT DOCUMENTS

| | | | |
|---|---|---|---|
| 3,726,086 A | 4/1973 | Herbstritt | |
| 3,964,253 A * | 6/1976 | Paduch et al. | 60/790 |
| 5,715,674 A * | 2/1998 | Reuter et al. | 60/39.281 |
| 5,806,300 A | 9/1998 | Veilleux, Jr. et al. | |
| 6,321,527 B1 | 11/2001 | Dyer et al. | |
| 6,412,271 B1 | 7/2002 | Maker et al. | |
| 6,484,510 B2 * | 11/2002 | Futa et al. | 60/790 |
| 6,487,847 B1 | 12/2002 | Snow et al. | |
| 6,526,743 B2 | 3/2003 | Maker et al. | |
| 6,962,485 B2 * | 11/2005 | Bennett et al. | 417/213 |
| 2002/0066266 A1 | 6/2002 | Maker et al. | |

FOREIGN PATENT DOCUMENTS

| | | |
|---|---|---|
| EP | 1 048 842 A2 | 11/2000 |
| GB | 1 525 364 | 9/1978 |

* cited by examiner

*Primary Examiner* — Peter J Bertheaud
(74) *Attorney, Agent, or Firm* — Ingrassia Fisher & Lorenz, P.C.

(57) ABSTRACT

A fuel control system (100) for supplying metered fuel flow to a gas turbine engine is disclosed that includes a variable delivery fuel pump (116) for outputting a fuel flow that includes a burn fuel flow for the gas turbine engine and a surplus fuel flow recirculated back to an inlet (124) of the variable delivery fuel pump (116) and a pump control (148, 158, 122) for controlling the output of the variable delivery fuel pump to maintain the surplus fuel flow at a substantially constant rate. A method of controlling a fuel system (100) is also disclosed.

35 Claims, 7 Drawing Sheets

METHOD AND SYSTEM FOR FUEL CONTROL IN A GAS TURBINE ENGINE

CROSS-REFERENCE TO RELATED APPLICATIONS

The present application claims the benefit of U.S. Provisional Patent Application No. 60/507,946, filed Oct. 3, 2003, the entire contents of which are hereby incorporated by reference.

FIELD OF THE INVENTION

This invention relates to a method and apparatus for fuel supply, and more particularly, to a method and apparatus for controlling a variable delivery fuel pump in a gas turbine engine fuel control system.

BACKGROUND OF THE INVENTION

Fuel control systems for gas turbine engines typically include fixed positive displacement fuel pumps. Such pumps deliver fuel at a rate sufficient to satisfy maximum system demands. When operating at less than maximum demand, excess fuel is recirculated back to the pump. This circulation of surplus fuel disadvantageously generates excess heat, and consumes power.

To address these drawbacks of fixed delivery fuel pumps, variable delivery, positive displacement fuel pumps may be used to alter the amount of fuel delivered by the pump in response to changes in demand. One known technique for controlling the amount of delivered fuel involves maintaining a constant pressure drop across a metering valve in a fuel delivery path by varying the pump displacement.

A known fuel delivery system for aircraft gas turbine engines includes a variable delivery, positive displacement fuel pump to supply burn fuel flow to the gas turbine engine and servo flow to the servo systems in the fuel control. To ensure adequate burn fuel flow to the gas turbine engine despite variations in servo flow, e.g., due to servo flow surges resulting from repositioning actuators on the engine, commanding changes in burn flow to the engine, etc., surplus fuel flow ("capacitance") is provided by the fuel pump. In the known variable delivery, positive displacement fuel pump system, the amount of surplus fuel flow varies as a function of the burn flow to the gas turbine engine and fuel system back pressure. A disadvantage of this type of system is that minimum surplus flow must be met at low system back pressures, resulting in excess surplus flow, and therefore excess heat generation, at high system back pressures.

SUMMARY OF THE INVENTION

In one aspect, the present invention is a method for controlling a variable delivery, positive displacement fuel pump output to maintain a substantially constant surplus fuel flow. According to another aspect, the present invention is an apparatus for controlling a variable delivery, positive displacement fuel pump to maintain a substantially constant surplus fuel flow.

Another aspect of the invention comprises a fuel control system for supplying a metered fuel flow to a gas turbine engine which system includes a variable delivery fuel pump. The fuel pump outputs a fuel flow that includes a burn fuel flow for the gas turbine engine and a surplus fuel flow that is recirculated back to an inlet of the variable delivery fuel pump. A pump control controls the output of the variable delivery fuel pump to maintain the surplus fuel flow at a substantially constant rate.

A further aspect of the invention comprises a fuel delivery system for delivering fuel to a gas turbine engine that includes a variable delivery fuel pump with an inlet and an outlet. A first fuel path runs from the outlet to the engine and includes a metering valve. A proportional bypass valve connects points on the first fuel path upstream and downstream of the metering valve to maintain a substantially constant pressure drop across the valve, and a surplus fuel path leads from the proportional bypass valve to the pump inlet. A pump control varies the pump delivery rate and a control valve in the bypass fuel path controls the pump control in response to pressure changes in the surplus fuel path.

Another aspect of the invention comprises a method of delivering fuel to a gas turbine engine that involves providing a fuel pump with an inlet and an outlet, and providing a first fuel flow path from the outlet to the engine and a second fuel flow path from a point in said first fuel flow path to the inlet. The fuel flow in the second fuel flow path is maintained at a substantially constant rate.

An additional aspect of the invention comprises a fuel control system for supplying a flow of fuel to a gas turbine engine that includes a variable delivery fuel pump having an inlet and an outlet, a first flow path carrying fuel from the fuel pump outlet toward the engine, a second flow path carrying fuel from the first flow path to said fuel pump inlet, and a pump control for controlling the output of the variable delivery fuel pump to maintain a fuel flow along the second flow path at a substantially constant rate.

Yet another aspect of the invention comprises a fuel control system for supplying a flow of fuel to a gas turbine engine that includes a pumping device having an inlet and an outlet, a first flow path carrying fuel from the pumping device outlet toward the engine, a second flow path carrying fuel from the first flow path to the pumping device inlet, and a control device for controlling the output of the pumping device to maintain a fuel flow along the second flow path at a substantially constant rate.

BRIEF DESCRIPTION OF THE DRAWINGS

These and other aspects and features of the present invention will be better understood after reading the following detailed description of embodiments of the invention together with the drawing figures wherein.

DETAILED DESCRIPTION

Figure 1:
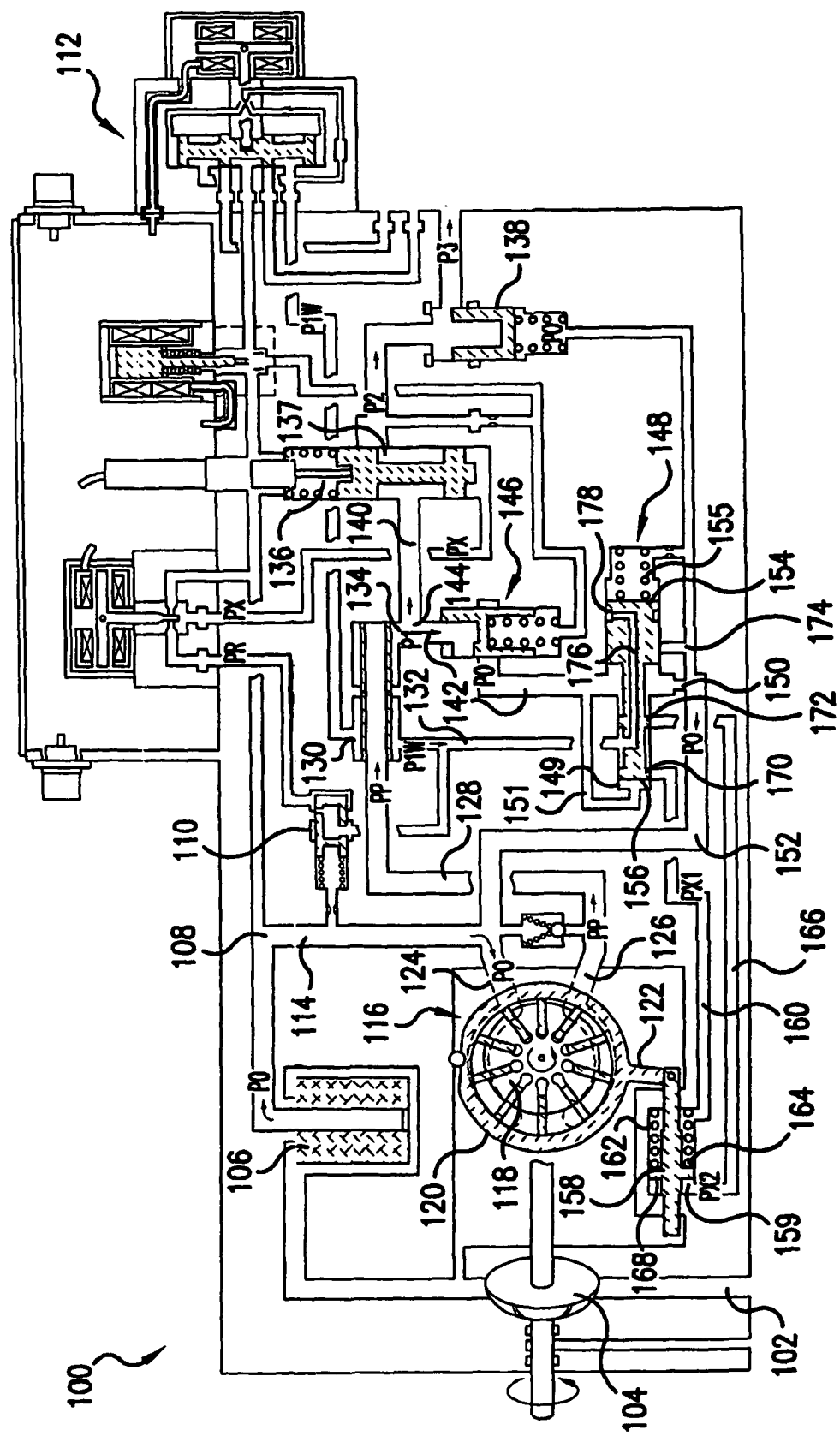
FIG. 1 illustrates a fuel control unit for a gas turbine engine that includes a variable delivery, positive displacement fuel pump and a control valve according to a first embodiment of the present invention.

Referring now to the drawings, wherein the showings are for purposes of illustrating several embodiments of the invention only, and not for the purpose of limiting same, FIG. 1 illustrates a fuel control system 100 that maintains a substantially constant amount of surplus fuel flow in accordance with one implementation of the present invention. Fuel follows various paths around system 100 which paths are defined by pipes, valves, channels, etc. These paths may be referred to variously herein as "flow paths," "fuel paths," and "fuel flow paths," and the fuel moving within these paths may be referred to as a "fuel flow."

Fuel enters fuel control system 100 via a first path 102 that extends from a fuel source (not shown) through a boost pump 104 and a pump interstage filter 106 to a first branching point 108. From branching point 108, a portion of the fuel flows along servo flow path 110 to actuator controls 112 where the fuel is used to control the positions of various actuators in a well known manner. A portion of the fuel reaching branching point 108 also flows along a pump supply path 114 at a pressure P0 toward a variable delivery fuel pump 116, preferably a positive displacement fuel pump comprising a vaned impeller 118 rotating within a movable housing 120, the position of which is controlled by swing cam 122. Fuel pump 116 includes an inlet 124 and an outlet 126, and the amount of fuel pumped from inlet 124 to outlet 126 per rotation of impeller 118 is determined by the relative positions of impeller 118 and housing 120.

Fuel leaves pump 116 along pump discharge path 128 at a pressure PP and travels to wash filter 130 whereat a portion of the flow exits along an auxiliary flow path 132, sometime referred to herein as high servo pressure P1W flow path 132 and discussed hereinafter, at a pressure PW1. Another portion of the fuel flow exits along a metered flow path 134 at a pressure P1 toward a metering valve 136 having a metering port 137 which is used to provide a precisely metered flow of fuel to a gas turbine engine (not shown). The metering valve 136 meters fuel by controlling the area of the metering port 137. Fuel exits metering valve 136 at a pressure P2 and passes through a pressurizing valve 138 on its way to an engine combustion chamber (not shown). The path taken by fuel from pump outlet 126, through wash filter 130, through metering valve 136 to the engine may be referred to herein as burn flow path 140 or first flow path 140.

A second flow path or surplus flow path 142 exits from first flow path 140 at branch point 144 upstream of metering valve 136. Fuel flows along path 142 at a pressure P1 and enters proportional bypass valve 146. Fuel leaves proportional bypass valve 146 at a pressure P0' and thereafter flows through a control valve 148 described in more detail hereinafter. The fuel leaves control valve 148 at pressure P0 and flows back to inlet 124 of fuel pump 116 via return flow path 152.

The proportional bypass valve 146 maintains a constant pressure drop across metering valve 136 by bypassing excess fuel flow back to pump inlet 124. It should be noted that maintaining a constant rate of bypass flow through the proportional bypass valve 146 will increase the accuracy of metered burn flow to the engine because of the more or less constant position of proportional bypass valve 146. Maintaining a constant rate of bypass flow through the proportional bypass valve 146 also allows for simple construction of the proportional bypass valve 146.

The metering valve 136 is positioned to maintain a desired burn fuel flow to the gas turbine engine, and a desired servo flow to the servo systems is controlled by actuator controls 112 in the servo flow path 110. The fuel flow discharged from variable displacement pump 116 includes a surplus fuel flow component, in addition to a burn fuel flow component for the gas turbine engine, and a servo flow or actuator flow component for the servo systems. The amount of surplus fuel flow may be based on, for example, peak servo usage, so that interruption of burn fuel flow will not occur during surges in servo flow (e.g., resulting from repositioning actuators on the engine, commanding changes in burn flow to the engine, etc.). Surplus flow is returned to the variable displacement vane pump 116 through a proportional bypass valve 146 and a pump displacement control valve 148 mounted for sliding movement within a cylinder 149.

Pump displacement control valve 148 includes a metering port 150 through which surplus fuel flows to return flow path 152 on its way back to pump 116. The position of control valve 148 is based on the pressures exerted on its first side 154 and second side 156. The pressure exerted on first side 154 is produced by spring 155 and the pressure P0 in return flow path 152. The pressure on second side 156 is equal to the pressure P0' upstream of control valve 148 because flow path 142 communicates with control valve cylinder 149 via line 151.

The position of swing cam 122, and therefore the output of variable delivery pump 116 is affected by the position of a control piston 158 connected to swing cam 122 and slidingly mounted in a cylinder 159. The position of control piston 158 is determined by the pressure PX1 in first control line 160 and the force of spring 162 applied against a first side 164 of control piston 158 and the pressure PX2 in second control line 166 applied against a second side 168 of control piston 158.

First and second control pressure lines 160, 166 extend from control valve cylinder 149 to first and second sides 164, 168 of cylinder 159 to apply pressure against first and second sides 164, 168 of control piston 158 respectively. Lands 170, 172 on control valve 148 block first and second flow paths 160, 166 under steady state conditions so that the pressures PX1 and PX2 are balanced and control piston 158 does not move. However, in the event of an increase in pressure P0' upstream of control piston 148, indicative of an excess amount of fuel in burn flow path 140, control valve 148 shuttles to the right in FIG. 1 exposing first control flow line 160 to pressure P0' and second control line 166 to high servo pressure P1W, which in turn lowers the pressure exerted on side 164 and raises the pressure exerted on side 168 of control piston 158, causing control piston 158 to move to the right as viewed in FIG. 1. This in turn causes housing 120 of pump 116 to shift so that the output of pump 116 decreases. When the pressure in burn flow path 140 returns to a predetermined level, control piston 148 shuttles to the left as viewed in FIG. 1, and lands 170 and 172 close the entrances to control lines 160 and 166, essentially stopping motion of control piston 158. The pump now outputs flow optimized for this given burn flow an servo flow condition.

Conversely, when pressure P0' on the upstream side of control valve 148 drops, valve 148 shuttles to the left as viewed in FIG. 1 moving lands 170 and 172 away from the openings of control lines 160 and 166 and exposing control line 160 to high servo pressure P1W and control line 166 to low pressure P0', which in turn raises the pressure exerted on side 164 and lowers the pressure exerted on side 168 of control piston 158. This shifts control piston 158 to the left as viewed in FIG. 1, which thus increases pressure P1 and P0'. A return of pressure P0' to a predetermined level causes control valve 148 to shift back to the right and closes the entrances to control lines 160 and 166, essentially stopping motion of control piston 158. The pump now outputs flow optimized for another given burn flow and servo flow condition.

This technique establishes a more or less constant rate of surplus, or bypass flow along surplus flow path 142. Pump displacement control valve 148 also incorporates a secondary bypass flow port 174 for handling any surge of high bypass flow rate from proportional bypass valve 146. This secondary bypass flow port 174 also allows the proportional bypass valve 146 to maintain pressure regulation across the metering valve 136 in the event of a failure where the pump 116 is stuck at maximum displacement.

Control valve 148 also includes an interior channel 176 connected to high servo pressure P1W flow path 132 in order to supply fuel to an annulus 178 in valve 148 adjacent cylinder 149 to reduce friction between valve 148 and cylinder 149 thus providing a hydraulic bearing. This also reduces valve motion hysteresis.

Figure 2:
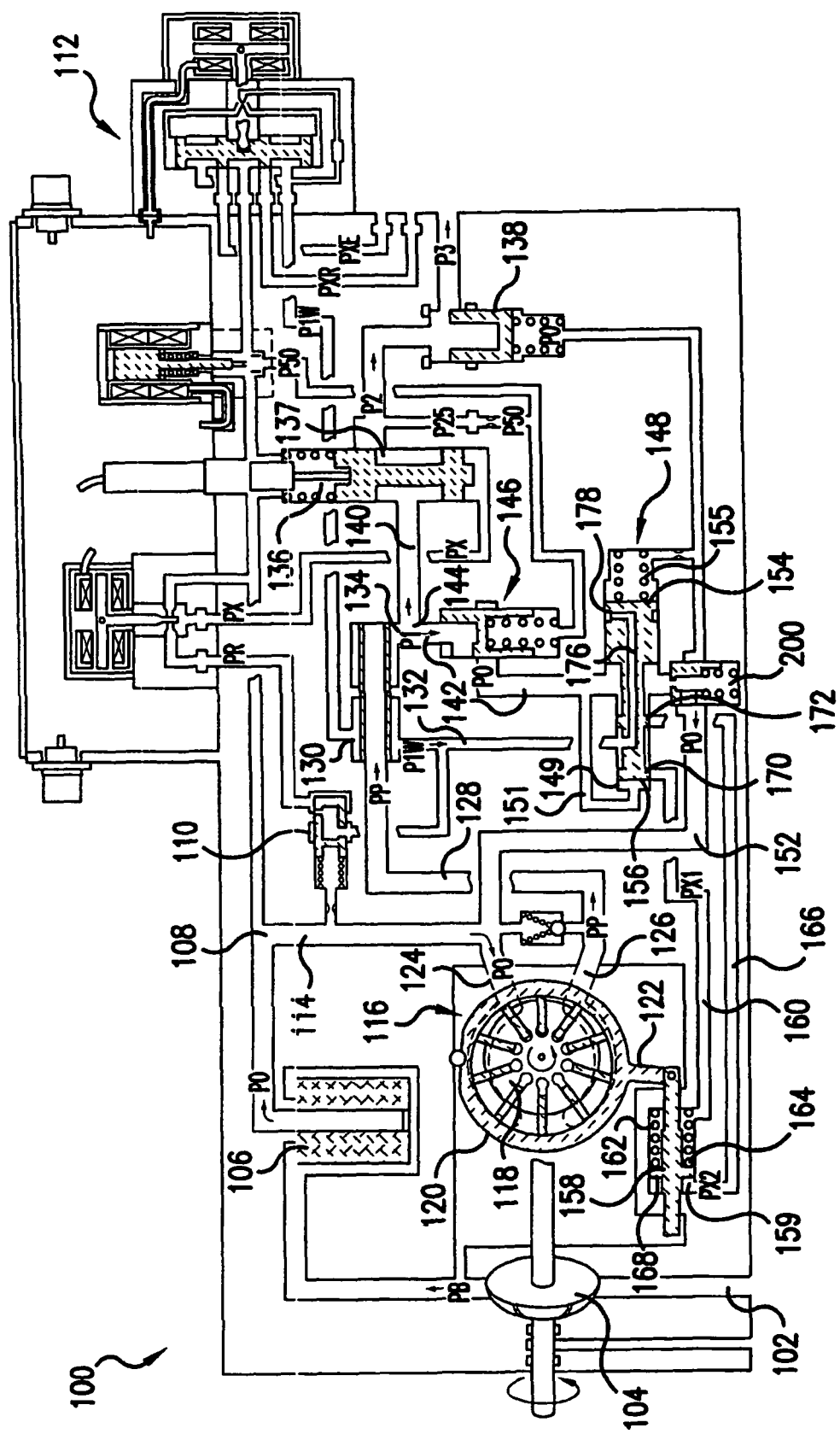
FIG. 2 illustrates fuel control unit for a gas turbine engine that includes a variable delivery, positive displacement fuel pump and a control valve according to a second embodiment of the present invention.

FIG. 2 illustrates an alternative embodiment of the fuel control system 100 of FIG. 1 wherein elements common to both embodiments are designated by the same reference numerals in the Figures. In this embodiment, fuel control system 100 includes a bypass flow relief valve 200 downstream of the pump displacement control valve 148. Therefore, in the embodiment illustrated in FIG. 2, the mechanism for handling surges of high bypass flow comprises a separate valve 200 instead of as a secondary bypass flow port 174 in the pump displacement control valve 148 illustrated in the embodiment of FIG. 1.

Figure 3:
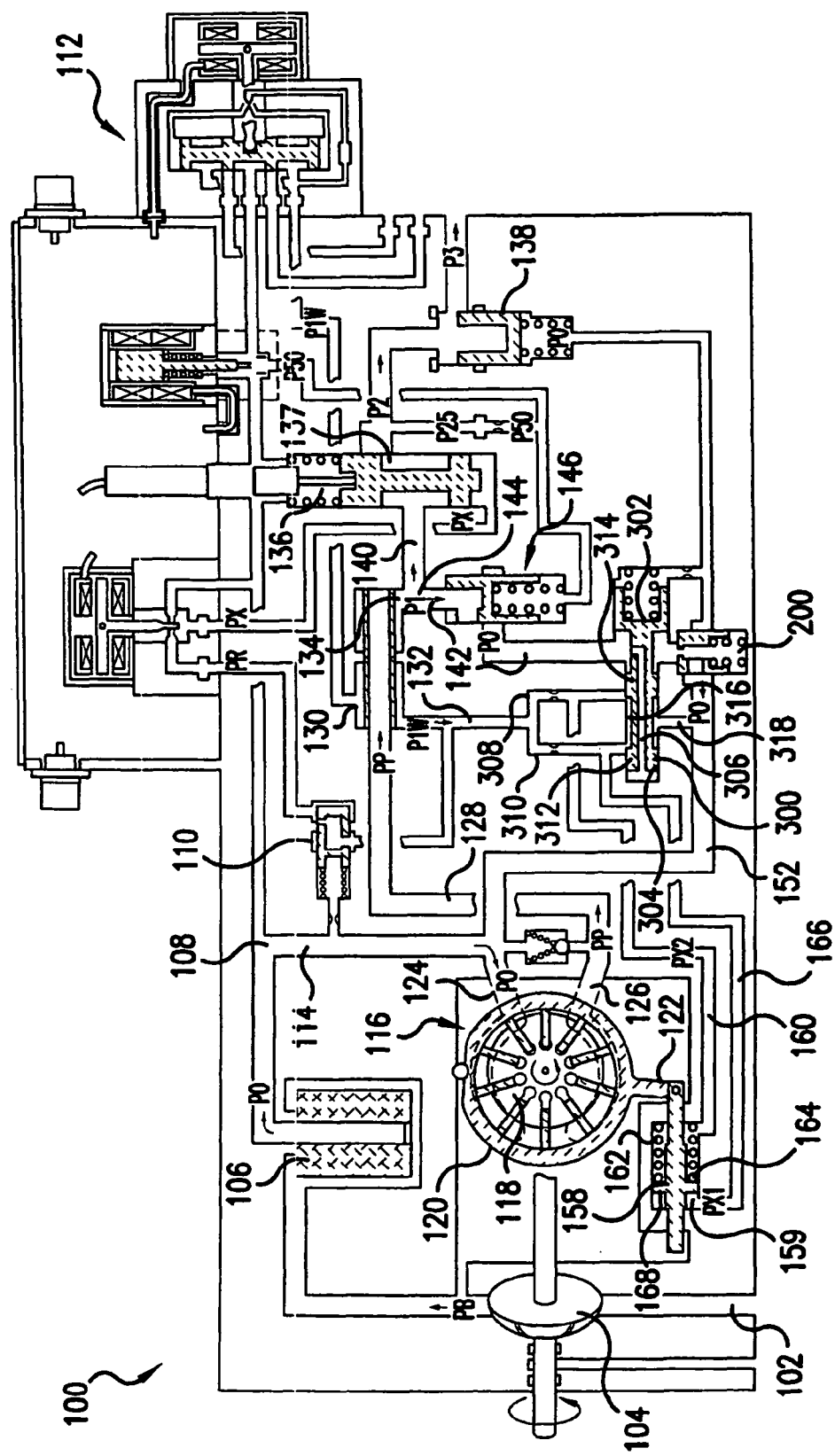
FIG. 3 illustrates fuel control unit for a gas turbine engine that includes a variable delivery, positive displacement fuel pump and a control valve according to a third embodiment of the present invention.

FIG. 3 illustrates another alternative embodiment of the fuel control system 100 of FIG. 1 wherein elements common to the embodiments are designated by the same reference numerals in the Figures. The fuel control system 100 of FIG. 3 includes a control valve 300 having a first end 302 exposed to pressure P0 in return flow path 152 and a second end 304 exposed to the pressure P0' upstream of control valve 300 via a valve internal passageway 306 which provides fluid communication between surplus fuel flow path 142 and second end 304. In this embodiment, auxiliary flow path 132 includes first and second branches 308, 310 that connect with cylinder 149 housing valve 300. First and second lands 312, 314 on valve 300 separated by channel 316 therebetween, partially block each of these first and second branches 308, 310 and allow fuel to flow into channel 316 and out passage 318 to return flow path 152. First control line 160 communicates with first branch 308 while second control line 166 communicates with second branch 310. Shifts in the position of valve 300 caused by pressure changes across valve 300 affect the percentage of auxiliary fuel flow that passes through each of the first and second branches 308, 310 thus changing the pressures in first and second control lines 160, 166 which in turn adjusts the delivery rate of pump 116.

Figure 4:
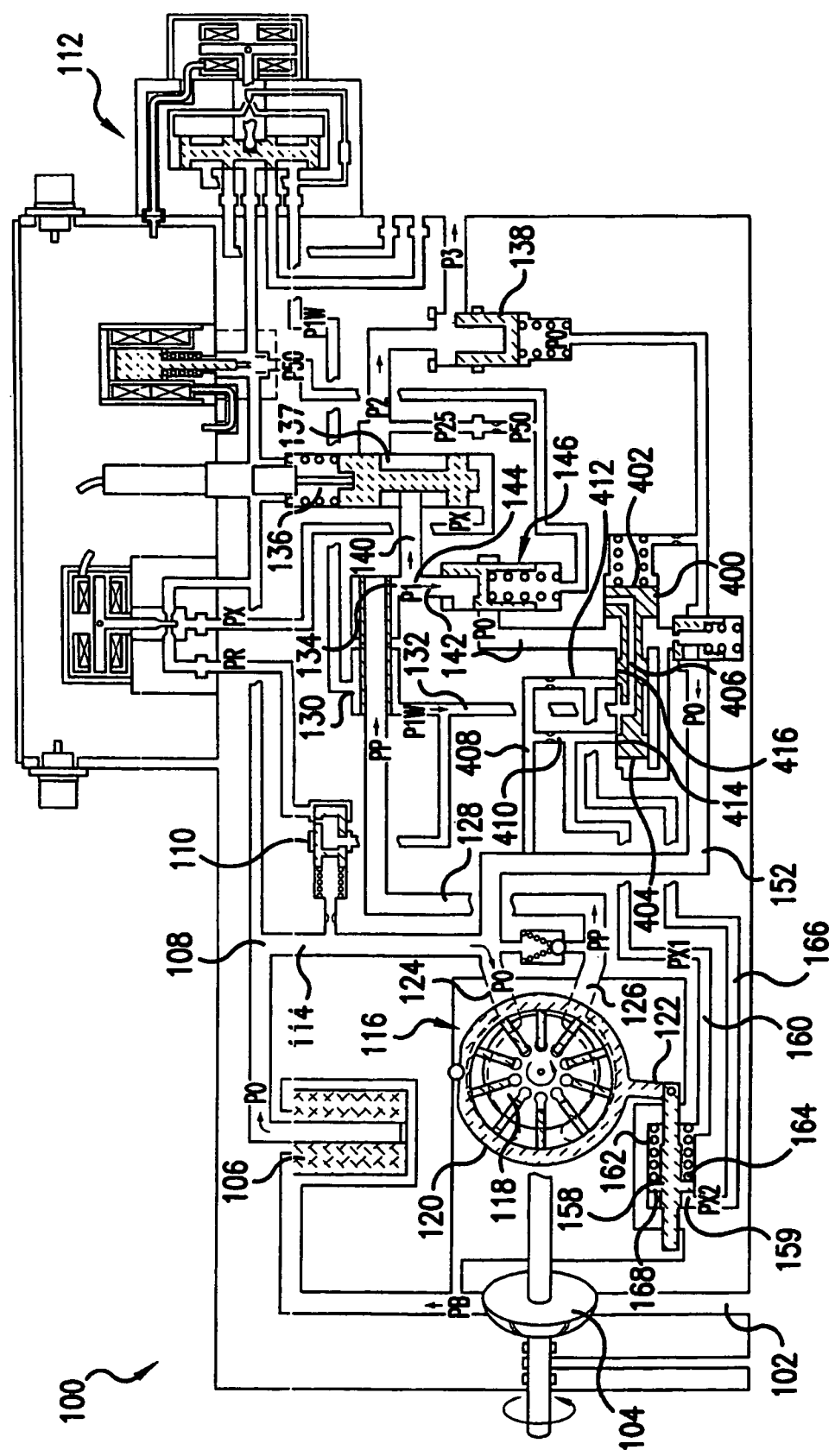
FIG. 4 illustrates fuel control unit for a gas turbine engine that includes a variable delivery, positive displacement fuel pump and a control valve according to a fourth embodiment of the present invention.

FIG. 4 illustrates yet another alternative embodiment of the fuel control system 100 of FIG. 1 wherein elements common to the embodiments are designated by the same reference numerals in the Figures. Fuel control system 100 in this embodiment includes a control valve 400 having a first end 402 in fluid communication with a first pressure P0 and a second end 404 in fluid communication with a second pressure P0'. Valve 400 includes an internal passageway 406 in fluid communication with high pressure servo P1W flow path 132 to provide hydraulic lubrication for valve 400. A line 408 having first and second branches 410, 412 connects fuel return flow path 152 to cylinder 149. First and second branches 410 and 412 are partially blocked by first and second lands 414, 416 on valve 400. First control line 160 communicates with first branch 410 while second control line 166 communicates with second branch 412. Changes in the pressure drop across valve 400 affect the position of valve 400 and thus control the fluid flow to first and second control lines 160, 166, the position of control piston 158, and the output of pump 116 as described above.

Figure 5:
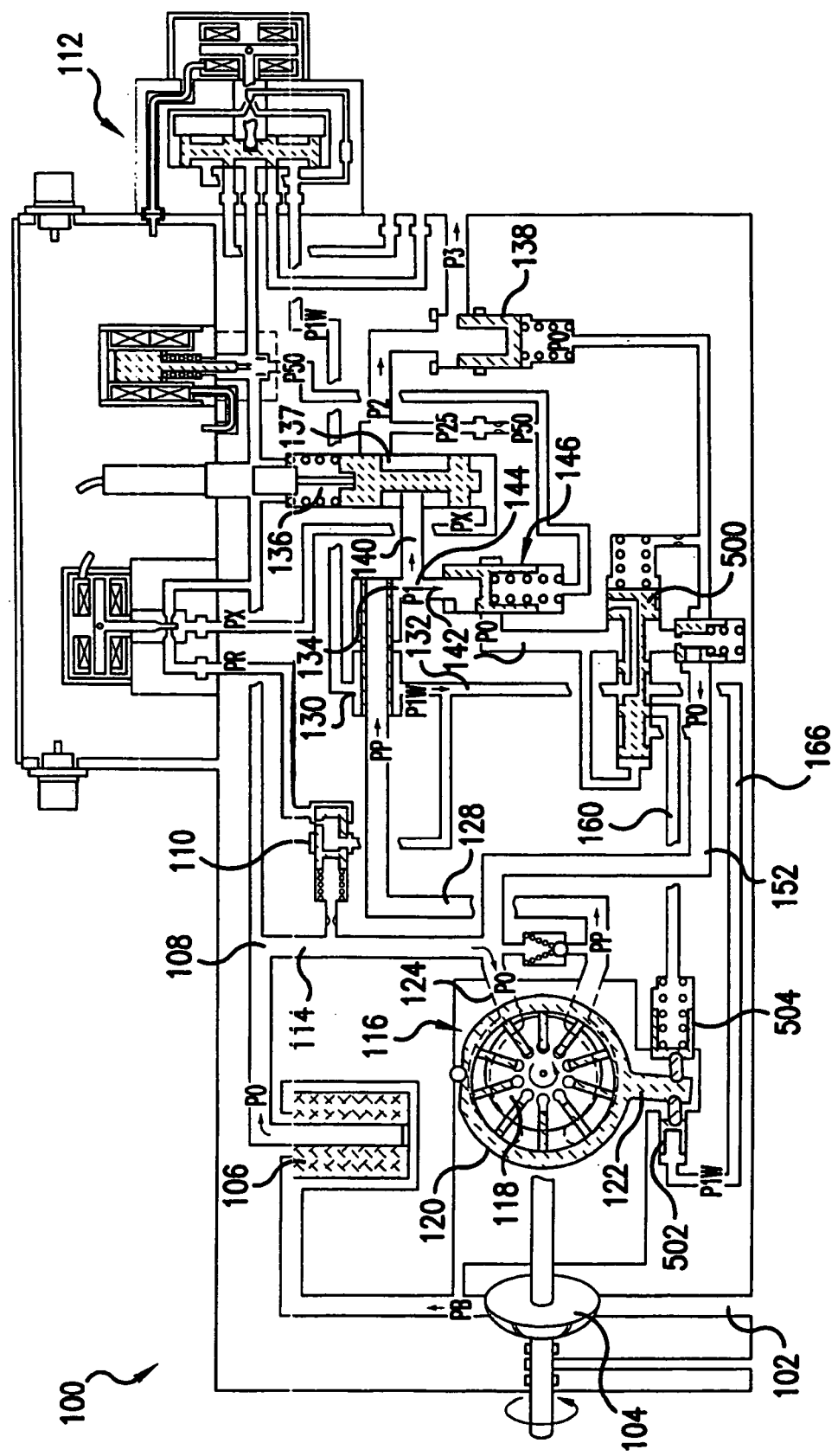
FIG. 5 illustrates fuel control unit for a gas turbine engine that includes a variable delivery, positive displacement fuel pump and a control valve according to a fifth embodiment of the present invention.

FIG. 5 illustrates yet another alternative embodiment of the fuel control system 100 of FIG. 1 wherein elements common to the embodiments are designated by the same reference numerals in the Figures. In the fuel control system 100 of FIG. 5, the position of swing cam 122 of pump 116 is controlled by a bias piston 502 on one side thereof and a control piston 504 on the other side thereof. High servo pressure P1W from flow path 132 is applied against bias piston 502 while a pressure PX is applied against control piston 504. Changes in the position of control valve 500 vary pressures P1W and PX to vary the positions of bias piston 502 and control piston 504 and move swing cam 122 to affect the output of pump 116 as described above.

Figure 6:
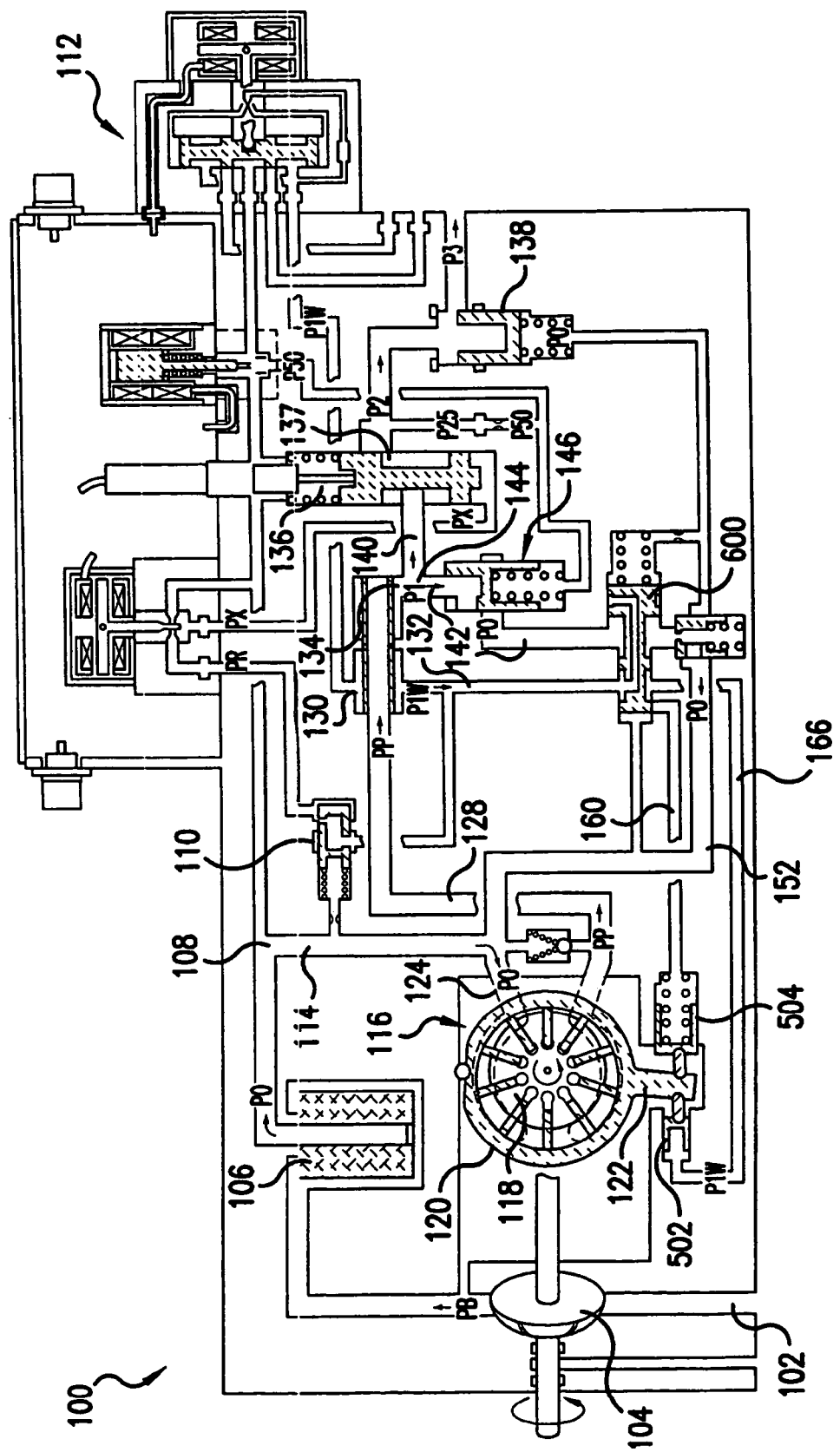
FIG. 6 illustrates fuel control unit for a gas turbine engine that includes a variable delivery, positive displacement fuel pump and a control valve according to a sixth embodiment of the present invention.

FIG. 6 illustrates yet another alternative embodiment of the fuel control system 100 of FIG. 1 wherein elements common to the embodiments are designated by the same reference numerals in the Figures. The fuel control system 100 of the implementation illustrated in FIG. 6 is similar to the system 100 of FIG. 5. The pump displacement control valve 600 in FIG. 6 has a different configuration for metering variable control pressure PX1 to the variable displacement control piston 504. Specifically, pressure P0' acts only on the annular area between the head and rod end of pump displacement control valve 600. This implementation reduces the number of lands needed on valve 600, and simplifies the channeling connecting pressures to the valve.

Figure 7:
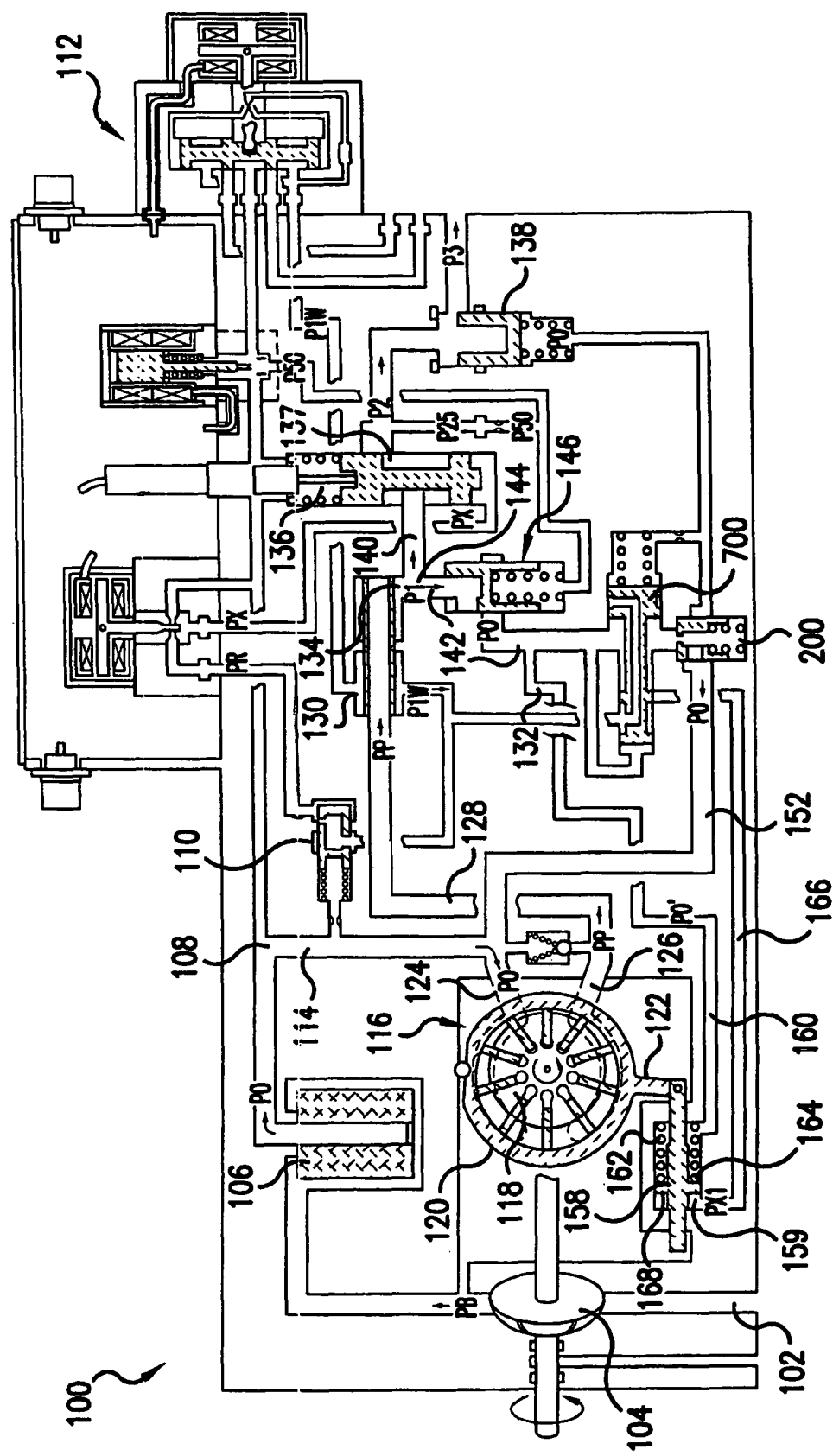
FIG. 7 illustrates fuel control unit for a gas turbine engine that includes a variable delivery, positive displacement fuel pump and a control valve according to a seventh embodiment of the present invention.

FIG. 7 illustrates yet another alternative embodiment of the fuel control system 100 of FIG. 1 wherein elements common to the embodiments are designated by the same reference numerals in each Figure. In FIG. 7, the fuel control system 100 utilizes the pump displacement control valve 700 to meter a variable displacement control pressure PX1 to the variable displacement control piston 158 and supplies the pressure P0' of surplus flow line 142 to the opposite end of piston 162, thereby controlling the swing cam 122 to vary the output of the variable displacement vane pump 116 as a function of bypass flow.

It should be recognized that additional variations of the above-described implementations may be reached without departing from the spirit and scope of the present invention.

What is claimed is:

1. A fuel control system for supplying metered fuel flow to a gas turbine engine comprising:
    a variable delivery fuel pump for outputting a fuel flow, said fuel flow including a burn fuel flow for the gas turbine engine and a surplus fuel flow recirculated back to an inlet of said variable delivery fuel pump;
    a metering valve coupled to receive the burn fuel flow;
    a proportional bypass valve connected between a first point upstream of said metering valve and a second point downstream of said metering valve for maintaining a substantially constant pressure drop across said metering valve; and
    a pump control for controlling the output of said variable delivery fuel pump to maintain said surplus fuel flow at a substantially constant rate independent of the pressure drop across said metering valve.

2. The fuel control system of claim 1 including a movable element for varying a delivery rate of said variable delivery fuel pump.

3. The fuel control system of claim 2 wherein said pump control comprises a piston operatively connected to said movable element and having a first end exposed to a first pressure and a second end exposed to a second pressure.

4. The fuel control system of claim 3 wherein said pump control comprises a control valve in said surplus fuel flow controlling said first pressure.

5. The fuel control system of claim 1 wherein said burn fuel flow and said surplus fuel flow comprises first and second components of a single flow exiting said fuel pump.

6. The fuel control system of claim 1 wherein said variable delivery fuel pump comprises a positive displacement fuel pump.

7. A fuel delivery system for delivering fuel to a gas turbine engine comprising:
a fuel pump delivering fuel at a variable rate and having an inlet and an outlet;
a first fuel path from said fuel pump outlet to the engine;
a metering valve in said first fuel path;
a proportional bypass valve connected between a first point in said first fuel path upstream of said metering valve and a second point in said first fuel path downstream of said metering valve for maintaining a substantially constant pressure drop across said metering valve;
a surplus fuel path from said proportional bypass valve to said inlet;
a pump control for varying the delivery rate of said pump; and
a control valve in said surplus fuel path for controlling said pump control (i) in response to pressure changes in said surplus fuel path and (ii) independent of the pressure drop across said metering valve.

8. The fuel delivery system of claim 7 wherein said pump control comprises a member shiftable in a first direction for increasing said rate and in a second direction for decreasing said rate.

9. The fuel delivery system of claim 8 wherein said member comprises a piston shiftable between a first position and a second position.

10. The fuel delivery system of claim 8 wherein said member comprises a piston shiftable in a cylinder and including a first pressure line running from a first output of said control valve to a first side of said cylinder.

11. The fuel delivery system of claim 10 including a second pressure line running from a fluid flow path of said system and to a second side of said cylinder.

12. The fuel delivery system of claim 11 wherein a pressure in said fluid flow path of said system is controlled by said control valve.

13. The fuel delivery system of claim 10 wherein said surplus fuel path comprises a return flow path from an outlet of said control valve to the inlet of said fuel pump.

14. The fuel delivery system of claim 10 including a pressure relief valve in said surplus fuel path downstream of said control valve.

15. The fuel delivery system of claim 7 wherein said control valve includes a hydraulic bearing.

16. The fuel delivery system of claim 7 wherein said control valve comprises an open center valve.

17. A method of delivering fuel to a gas turbine engine comprising the steps of:
providing a fuel pump having an inlet and an outlet;
providing a first fuel flow path from said outlet to the engine, said first fuel flow path including a metering valve having a pressure drop there-across;
providing a second fuel flow path from a point in said first fuel flow path, upstream of said metering valve, to said inlet; and
maintaining a fuel flow in said second fuel flow path at a substantially constant rate independent of the pressure drop across said metering valve.

18. The method of claim 17 wherein said step of maintaining a fuel flow in the second fuel flow path at a substantially constant rate comprise the steps of detecting pressure changes in the second fuel flow path and changing the output of the fuel pump in response to detected pressure changes.

19. The method of claim 18 wherein the fuel pump comprises a variable delivery positive displacement fuel pump and said step of changing the output of the fuel pump in response to detected pressure changes comprises the step of changing the delivery rate of the fuel pump.

20. The method of claim 19 wherein said step of changing the delivery rate of the fuel pump comprises the step of increasing the delivery rate of the fuel pump in response to a detected pressure drop in the second fuel flow path.

21. The method of claim 20 wherein said step of changing the delivery rate of the fuel pump comprises the step of decreasing the delivery rate of the fuel pump in response to a detected pressure rise in the second fuel flow path.

22. The method of claim 18 wherein said step of changing the output of the fuel pump in response to detected pressure changes comprises the step of shifting a piston in a cylinder.

23. The method of claim 22 including the additional steps of providing a control valve in the second flow path, subjecting a first end of the piston to a first pressure related to the position of the control valve and subjecting a second end of the piston to a second pressure.

24. The method of claim 23 wherein said step of subjecting a second end of the piston to a second pressure comprises the step of subjecting the second end of the piston to a second pressure related to the position of the control valve.

25. A fuel control system for supplying a flow of fuel to a gas turbine engine comprising:
a variable delivery fuel pump having an inlet and an outlet;
a first flow path carrying a flow of burn fuel from the fuel pump outlet toward the engine;
a metering valve coupled to receive the flow of burn fuel;
a proportional bypass valve connected between a first point upstream of said metering valve and a second point downstream of said metering valve for maintaining a substantially constant pressure drop across said metering valve;
a second flow path carrying fuel from said first flow path to said fuel pump inlet; and
a pump control for controlling the output of said variable delivery fuel pump to maintain a fuel flow along said second flow path at a substantially constant rate independent of the pressure drop across said metering valve.

26. The fuel control system of claim 25 including a control valve in said second flow path between said proportional bypass valve and said inlet.

27. The fuel control system of claim 26 wherein said control valve is operably connected to said variably delivery fuel pump.

28. The fuel control system of claim 27 wherein said variable delivery fuel pump comprises a variable delivery positive displacement fuel pump.

29. The fuel control system of claim 26 including a pressure relief valve in said second flow path downstream of said control valve.

30. The fuel control system of claim 26 including a member shiftable to control the delivery rate of said variable delivery fuel pump and a first control flow path from a first portion of said control valve to a first portion of said member.

31. The fuel control system of claim 30 including a second control flow path from a second portion of said control valve to a second portion of said member.

32. A fuel control system for supplying a flow of fuel to a gas turbine engine comprising:
   pump means having an inlet and an outlet;
   a first flow path carrying fuel from the pump means outlet toward the engine;
   metering means disposed in said first flow path and having a substantially constant pressure drop there-across;
   a second flow path carrying fuel from said first flow path to said pump means inlet; and
   control means for controlling the output of said pump means to maintain a fuel flow along said second flow path at a substantially constant rate independent of the pressure drop across the metering means.

33. A fuel delivery system for delivering fuel to a gas turbine engine comprising:
   a fuel pump delivering fuel at a variable delivery rate and having a fuel pump inlet and a fuel pump outlet;
   a first fuel path from said fuel pump outlet to the engine;
   a metering valve in said first fuel path;
   a proportional bypass valve connected between a first point in said first fuel path upstream of said metering valve and a second point in said first fuel path downstream of said metering valve for maintaining a substantially constant pressure drop across said metering valve;
   a surplus fuel path from said proportional bypass valve to said fuel pump inlet;
   a pump control for varying the delivery rate of said fuel pump, said pump control comprising a member having a first side and a second side, a first pressure line in fluid communication with said first side, and a second pressure line in fluid communication with said second side, said member responsive to variations in fuel pressures in said first and second pressure lines to move in a first direction and a second direction to thereby increase and decrease, respectively, the delivery rate; and
   a control valve in said surplus fuel path for controlling said pump control in response to pressure changes in said surplus fuel path, said control valve movable, from a steady state position, in a first direction and a second direction, said control valve comprising, a first inlet port in fluid communication with said first fuel path, a second inlet port in the surplus fuel path through which surplus fuel flows to said fuel pump inlet, a first control pressure output port in fluid communication with said first pressure line, and a second control pressure output port in fluid communication with said second pressure line,
   wherein:
      when said control valve is in the steady state position, said first and second control pressure output ports are both fluidly isolated from said first and second inlet ports,
      when said control valve moves from the steady state position in the first direction, said first control pressure output port is in fluid communication with said second inlet port, and said second control pressure port is in fluid communication with said first inlet port, and
      when said control valve moves from the steady state position in the second direction, said first control pressure output port is in fluid communication with said first inlet port, and said second control pressure port is in fluid communication with said second inlet port.

34. A fuel delivery system for delivering fuel to a gas turbine engine comprising:
   a fuel pump delivering fuel at a variable delivery rate and having a fuel pump inlet and a fuel pump outlet;
   a first fuel path from said fuel pump outlet to the engine;
   a metering valve in said first fuel path;
   a proportional bypass valve connected between a first point in said first fuel path upstream of said metering valve and a second point in said first fuel path downstream of said metering valve for maintaining a substantially constant pressure drop across said metering valve;
   a surplus fuel path from said proportional bypass valve to said fuel pump inlet;
   a pump control for varying the delivery rate of said fuel pump, said pump control comprising a member having a first side and a second side, a first pressure line in fluid communication with said first side and said first fuel path, and a second pressure line in fluid communication with said second side and said first fuel path, said member responsive to variations in fuel pressures in said first and second pressure lines to move in a first direction and a second direction to thereby increase and decrease, respectively, the delivery rate; and
   a control valve in said surplus fuel path for controlling said pump control in response to pressure changes in said surplus fuel path, said control valve movable in a first direction and a second direction, said control valve comprising, a first inlet port in fluid communication with said first pressure line and said first fuel path, a second inlet port in fluid communication with said second pressure line and said first fuel path, a third inlet port in the surplus fuel path through which surplus fuel flows to said fuel pump inlet, an outlet passage in fluid communication with said first inlet port, said second inlet port, and said fuel pump inlet,
   wherein movement of said control valve in said first and second directions varies fuel flow through said first and second inlet ports, and thereby varies the fluid pressures in said first and second pressure lines.

35. A fuel delivery system for delivering fuel to a gas turbine engine comprising:
   a fuel pump delivering fuel at a variable delivery rate and having a fuel pump inlet and a fuel pump outlet;
   a first fuel path from said fuel pump outlet to the engine;
   a metering valve in said first fuel path;
   a proportional bypass valve connected between a first point in said first fuel path upstream of said metering valve and a second point in said first fuel path downstream of said metering valve for maintaining a substantially constant pressure drop across said metering valve;
   a surplus fuel path from said proportional bypass valve to said fuel pump inlet;
   a pump control for varying the delivery rate of said fuel pump, said pump control comprising a member having a first side and a second side, a first pressure line in fluid communication with said first side and said fuel pump inlet, and a second pressure line in fluid communication with said second side and said fuel pump inlet, said member responsive to variations in fuel pressures in said first and second pressure lines to move in a first direction and a second direction to thereby increase and decrease, respectively, the delivery rate; and a control valve in said surplus fuel path and movable in a first direction and a second direction for controlling said pump control in response to pressure changes in said surplus fuel path, said control valve comprising a first inlet port in fluid communication with said first fuel path, a second inlet port in the surplus fuel path through which surplus fuel flows to said fuel pump inlet, a first control pressure output port in fluid communication with said first pressure line and said fuel pump inlet, and a second control pressure output port in fluid communication with said second pressure line and said fuel pump inlet, wherein movement of said control valve in said first and second directions varies fuel flow through said first and second control pressure output ports, and thereby varies fuel pressures in said first and second pressure lines.

* * * * *